Sept. 9, 1958 B. KAZAN 2,851,634

FLYING SPOT GENERATOR

Filed Aug. 3, 1953 2 Sheets-Sheet 1

INVENTOR.
Benjamin Kazan

BY [signature]
ATTORNEY

Sept. 9, 1958 B. KAZAN 2,851,634

FLYING SPOT GENERATOR

Filed Aug. 3, 1953 2 Sheets-Sheet 2

INVENTOR.
Benjamin Kazan
BY [signature]
ATTORNEY

United States Patent Office 2,851,634

Patented Sept. 9, 1958

2,851,634

FLYING SPOT GENERATOR

Benjamin Kazan, Princeton, N. J., assignor to Radio Corporation of America, a corporation of Delaware Application August 3, 1953, Serial No. 372,031

14 Claims. (Cl. 315—54)

This invention relates to apparatus for the production of a traveling spot of light, and more particularly to the production of a flying spot by means of activated electroluminescent substances.

Flying spot scanners or generators have proved extremely useful in many television studio applications as well as for laboratory purposes. In the television studio the flying spot scanner is more efficient for producing test patterns or program announcements than setting up a card in front of a studio camera or using a slide with a film camera. These latter methods tie up operating personnel and a camera. The monoscope camera is not flexible enough for varying announcements, since its pattern is physically and fixedly integrated into the monoscope tube. The flying spot scanner offers a solution to this problem since it provides a relatively inexpensive type of pick-up device. In certain laboratory tests, as for example, in examining the photo-emissivity or photoconductivity of crystals of certain substances, a flying spot scanner is invaluable inasmuch as it makes it possible to provide information on the response pattern of the particular crystal over its entire area and permits a visual presentation of this information on a display tube.

A present method of producing a flying spot involves the use of apparatus similar to that associated with the kinescope of modern television receivers. An electron beam is deflected horizontally and vertically to form a scanning raster on a phosphorescent screen. The phosphors on this screen possess a very short decay time, so that there is relatively little phosphor persistence during the time of beam travel from one element of the screen to the next. The electron beam itself is not amplitude modulated, thus differing from the ordinary television kinescope operation. In general, such a system requires deflection circuits and tubes whose second anodes are operated at 10 to 20 kilovolts for proper light output and focusing. For generating a video signal, a film slide is used. The light from the phosphor screen is focused by means of a lens and passes through the slide behind which a phototube is located. As the spot on the cathode ray tube, corresponding to the point of impingement of the electron beam on the rear surface of the phosphor, moves across the raster, it illuminates successive points on the slide. The variations in the transparency of the slide at such points determine the amount of light which reaches the phototube. The current given off by the phototube is then employed in a fashion similar to an ordinary video signal. Blanking and synchronizing pulses may then be mixed in to form a composite video signal.

The present invention relates to apparatus which can dispense with the cathode ray tube itself and the high voltage required to produce the spot. No deflection circuitry is required, and the apparatus may be constructed to occupy a smaller amount of space than the cathode ray tube type of system. Furthermore, it is possible to produce a raster upon a wide area without employing any intermediate optical system, such as would be the case if the cathode ray tube type of flying spot generation were employed. Through the use of the present invention, it is possible to produce a flying spot directly on a wide area. In cathode ray tube apparatus it is also essential that the linearity of the speed of the spot across each line be maintained. With the present invention, no special equipment is necessary therefor.

According to this invention, electroluminescent phosphor particles are embedded in a suitable plastic material and formed into a layer which is essentially planar. A number of delay lines which may be helical or of a lumped constant variety, are placed substantially in electrical contact with the phosphor in parallel rows. Pulses from an appropriate source are applied to each of the parallel delay lines in sequence so that a pulse travels down the length of each delay line. The characteristics of the electroluminescent phosphors embedded in this medium are such that light is emitted when the electric field across the phosphors is changing. Hence, as the pulse moves from point to point, a rapidly changing electric field is sequentially applied across successive points of the phosphor resulting in the appearance of a traveling or flying spot of light at the corresponding points.

It is, therefore, an object of this invention to provide apparatus for the generation of a moving spot of light on an essentially flat surface.

Another object of this invention is to provide a flying spot of light without the use of a cathode ray tube or similar instruments.

Another object of this invention is the production of a flying spot of light without the necessity for high potentials.

Another object of this invention is to provide a novel flying spot generator which can be used for large area scanning without an intermediate optical system.

A further object of this invention is to provide a flying spot scanner which requires no deflection circuitry, and whose parameters are more or less independent of the power supply voltages.

Still another object of the invention is to provide a novel flying spot generator wherein linearity of the spot speed across the raster is inherently maintained.

Other objects and advantages of the invention will become apparent and suggest themselves to those skilled in the art when the accompanying drawings are considered together with the following specification.

It is known that certain electroluminescent phosphors such as activated ZnS, when embedded in suitable plastic mediums emit light when a changing electric field is applied to them. The ZnS may be activated by any of a number of well-known techniques such as the addition of copper, or a copper salt in appropriate amounts.

One such plastic material may be composed of:

| | Percent |
|---|---|
| Ethyl cellulose | 1.97 |
| Iso amyl alcohol | 27.6 |
| Amylacetate | 42.2 |
| Acetone | 24.2 |
| Dioctylphthalate | 2.46 |
| Actylacetate | 1.35 |

It is to be understood, however, that any other suitable medium well known to those familiar with electroluminescent materials may also be used. The voltage required to excite such phosphors may be of the order of 100 volts for a layer .001" thick. It is also known that an electric wave may be transmitted along a line so that at the termination of the line the electric wave may be recovered. Such transmission lines invariably introduce a certain delay in the propagation of the electric wave from the input to the termination. A simple example of such a transmission line is the coaxial cable, or the so-called "twin lead," which commonly couples a television antenna to the receiver in the home. In television transmitters, such transmission line delay lines are often employed when the order of magnitude of the delay required is relatively small. When greater delays are required, the delay line may consist of a helically wound wire or coil or have lumped constants.

Figure 1:
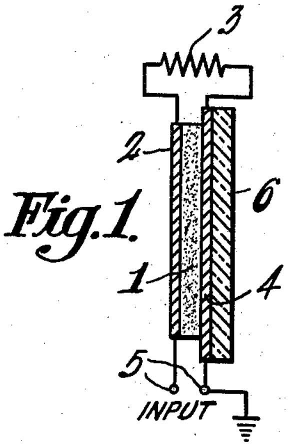
Figure 1 is a sectional and plan view of one embodiment of the present invention.

Figure 1 illustrates a very simple form of the invention. An essentially planar sheet or layer 1 of electroluminescent phosphor particles embedded in a plastic material is placed between two conductors 2 and 4, which form an effective transmission line. Conductor 2 may consist of a thin strip of aluminum deposited upon one surface of layer 1. Conductor 4 may consist of a thin strip of transparent conducting material in contact with the other surface of the layer 1 and opposite conductor 2. Such transparent conductive materials may be produced by exposing heated glass to vapors of silicon, tin or titanium chloride and then placing it in a slightly reducing atmosphere. The transparent conductive coating is also fused onto glass supporting plate 6. A resistance 3 shunts the end of the effective transmission line. Resistance 3 is so chosen that it is equal to the characteristic or surge impedance of the effective transmission line. Because of this, no reflection or standing waves are built up along the length of the effective transmission line. A pulse which may be either short or long as discussed below is applied to the terminals 5. The pulse creates a localized electric field as it moves down the length of the effective transmission line toward the characteristic impedance 3, and in so doing illuminates successive points along a narrow strip of the phosphor layer 1.

It is to be appreciated that, with an effective transmission line such as the one explained above, there will be a very rapid rate of propagation of the pulse impressed upon the terminals 5. Thus, the luminescent spot will travel across layer 1 with high speed. To form a complete raster, it is only necessary to place a number of effective transmission lines, each arranged as in Figure 1, parallel to one another so that each conductor of each pair of conductors is placed in contact with opposite sides of the layer 1. It is also possible to substitute a continuous conductive coating or sheet instead of a number of discrete conductors such as conductor 2. Pulses may then be applied sequentially to a number of input terminals similar to the terminals 5 of Figure 1.

Figure 2:
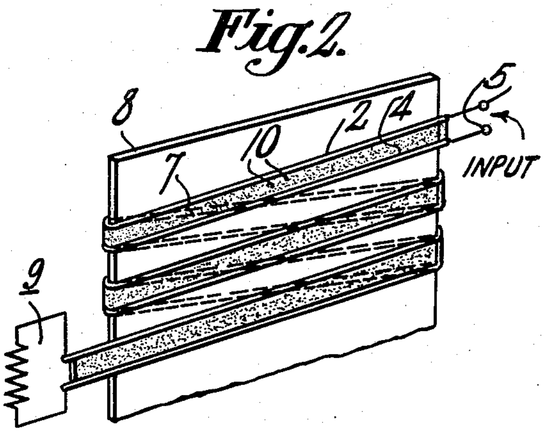
Figure 2 is a partially perspective view of another embodiment of the present invention.

It is also possible to embed the phosphor particles in a plastic medium which also encases the pair of conductors of a transmission line. In Figure 2 such an arrangement is illustrated. Particles 10 are dispersed throughout plastic material 7, which also encases conductors 2 and 4 of a transmission line 9. The transmission line 9 may be wound around a supporting plate 8, so that if pulses are applied to input terminals 5, a spot of light moves along the length of the transmission line to form a complete raster.

In this embodiment, if the plate 8 on which the transmission line 9 is wound is opaque, the flying spot of light will appear at the beginning of each new line at an interval corresponding to the length of one line since approximately 50% of the time it is returning by way of the invisible rear surface of the plate 8. If unidirectional scanning is not required, the plate 8 around which the transmission line 9 is wound could be transparent so that odd lines, for example, would be directly visible whereas even numbered lines would be seen through the transparent plate. In the latter case, the flying spot zig zags from top to bottom of the plate to form a raster by successively illuminating the electroluminescent material between the two conductors of the transmission line 9.

Figures 3, 4, 5:
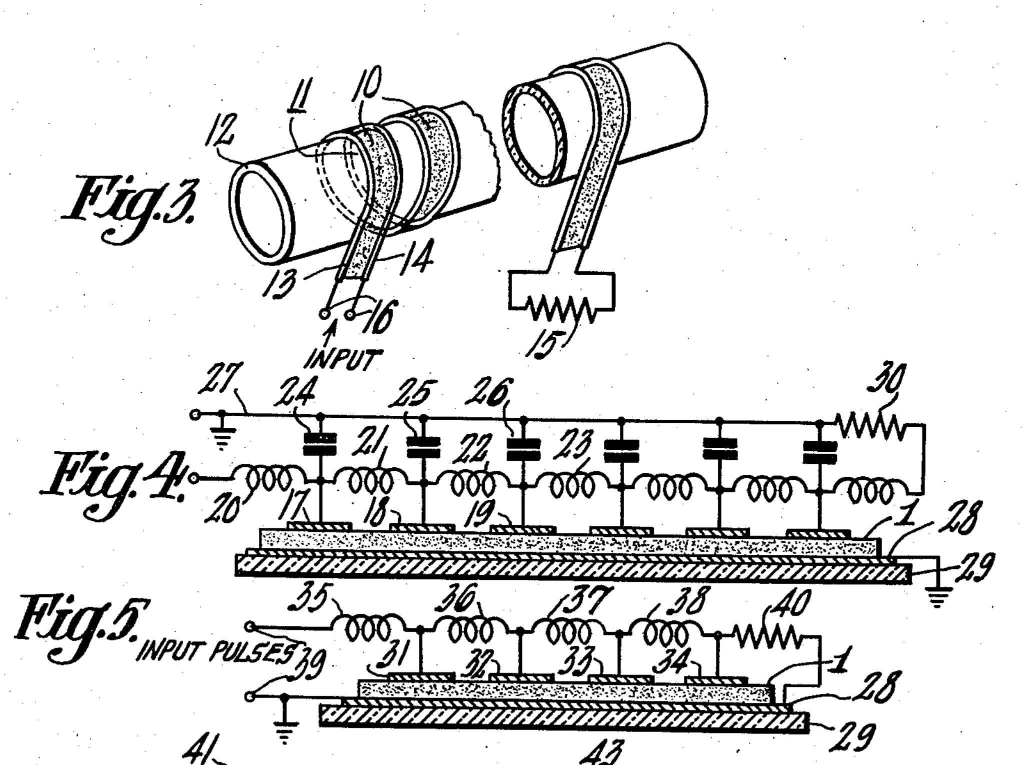
Figure 3 shows in a perspective and partially sectional view how one line of a complete scanning raster may be constructed according to the teachings of this invention.
Figure 4 is a sectional view and schematic illustration of another embodiment of the present invention.
Figure 5 is a sectional view and schematic representation of still another form of this invention.

Instead of winding the transmission line to form the complete raster as above, one could also wind it to form each line as illustrated by Figure 3. A transmission line 11 which may be similar to line 5 of Figure 2, is wound helically about a core 12. The line 11 contains numerous phosphor particles 10 embedded in a suitable plastic material between conductors 13 and 14, which may be also encased by the plastic. The core 12 might be made of some dielectric material such as glass, but its composition may vary according to structural or other requirements. At the end of the core, the transmission line 11 is terminated in its characteristic impedance 15 to prevent reflection of the pulses which are applied to the input terminals 16. A number of such arrangements illustrated in Figure 3 could be placed parallel to one another to form a complete scanning raster.

Figure 4 illustrates an alternative embodiment of this invention. The transmission line of Figure 1, as already noted, gave a very rapid spot movement, but in applications where less speed is required, a lumped constant type of delay line may be used. In general longer delay times can be derived from lumped circuit elements, the delay being given by the equation:

$$t=\sqrt{LC}$$

where L is inductance per section and C is capacity per section. Such delay lines may produce delays on the order of 5 microseconds, for example. A detailed discussion of such delay lines may be found in section 6.3, at page 209, et seq. of "Components Handbook" by J. F. Blackburn, volume 17, in the M. I. T. Radiation Laboratory Series (McGraw-Hill, 1949). At page 216 the characteristics of BTL type D–172,597 are set forth. For a nine inch length, a delay of 4.6 microseconds is attainable with an attenuation of about eight db and with negligible distortion of a one microsecond pulse. Other lumped-parameter delay lines have been developed having delay times on the order of 20 to 25 microseconds for about an eight inch length.

As illustrated by Figure 4, a number of conductive elements 17, 18 and 19 is arranged in contact with one surface of layer 1, which may be identical to layer 1 in Figure 1 and consists of a phosphor embedded in a suitable plastic material. A number of separate coils 20, 21, 22, and 23 or a continuous helix is grounded at one end, and is tapped at regular intervals so as to make connection with the elements 17, 18 and 19. A number of condensers 24, 25 and 26 which may be identical, are also coupled to the elements 17, 18 and 19 and to input conductor 27 to assist in providing the requisite delay. A layer of transparent conductive material such as a coating 28 upon a transparent plate 29 is placed in contact with that surface of plate 1 which is opposite the surface on which elements 17, 18 and 19 are placed. The coating 28 is grounded, and thus there is a capacitive effect between it and each of the elements 17, 18 and 19 when a pulse is applied to the helix. As the pulse travels along the coils 20, 21, 22 and 23 and the conductor 27, a portion of it is tapped off and fed successively to each of the elements 17, 18 and 19. A terminating impedance 30 is placed at the end of the coils and the conductor 27. This impedance is the characteristic impedance of this line and serves as in previous figures to prevent reflection of the pulse. Transparent plate 29 may be glass or other material which will act to support the layer 1 and the transparent conductive coating 28.

Figure 5 illustrates an arrangement of a different form of the invention in which no additional capacity is used. In this embodiment, the conducting elements 31, 32, 33 and 34 together with the portion of the coating 28 immediately opposite constitute a plurality of discrete capacitors. The elements may be deposited upon the phosphor layer 1 which is placed into contact with a transparent conductive coating 28 that is mounted on the glass plate 29. The segments of the helix or the individual coils 35, 36, 37 and 38, as the case may be, are attached to the conductive elements 31–34 directly, with the phosphor layer 1 acting as the dielectric of each capacitor. The transparent conductive coating 28 is grounded as in the former illustrations. Input pulses are applied between terminal 39 and ground travel between the coils 35–38 and ground successively exciting the phosphor layer 1 between each discrete capacitor and are finally dissipated in the characteristic impedance 40 which terminates the delay line.

Figure 6:
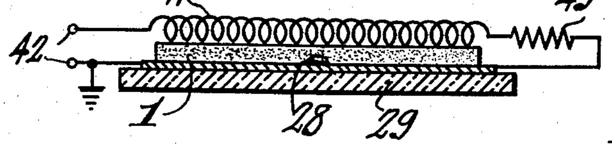
Figure 6 is a sectional and partially schematic representation of an alternative embodiment of the present invention.

Figure 6 is similar to the arrangement of Figure 5, except that instead of lumped constants being used to constitute the delay line, a helix 41 is solely responsible for the delay of the pulse applied between terminal 42 and coating 28. The helix is placed so that a point on each of its turns is in contact with layer 1, which may be the same as layer 1 mentioned above. This may be accomplished by mounting the helix on appropriate physical structures so that the requisite contact is made, or it can be done by printing the equivalent of a helix on one surface of phosphor layer 1 in accordance with well known printed circuit manufacturing techniques. One equivalent might be a zig zag conductive line printed on layer 1. Thus, the applied pulse travels from the input terminal 42 through the helix 41 or its printed equivalent producing at each turn a luminescent area on the layer 1, because of the transient voltage existing between that turn and the coating 28. The pulse travels until it reaches impedance 43, which represents the characteristic impedance of the helix 14 and prevents reflection. Successive lines, which may consist of a number of such arrangements placed parallel to one another, may be scanned in the same manner. Each of the helices forming the successive lines may be energized by successive pulses from an appropriate source as will be explained below.

Figures 7, 8, 9, 10:
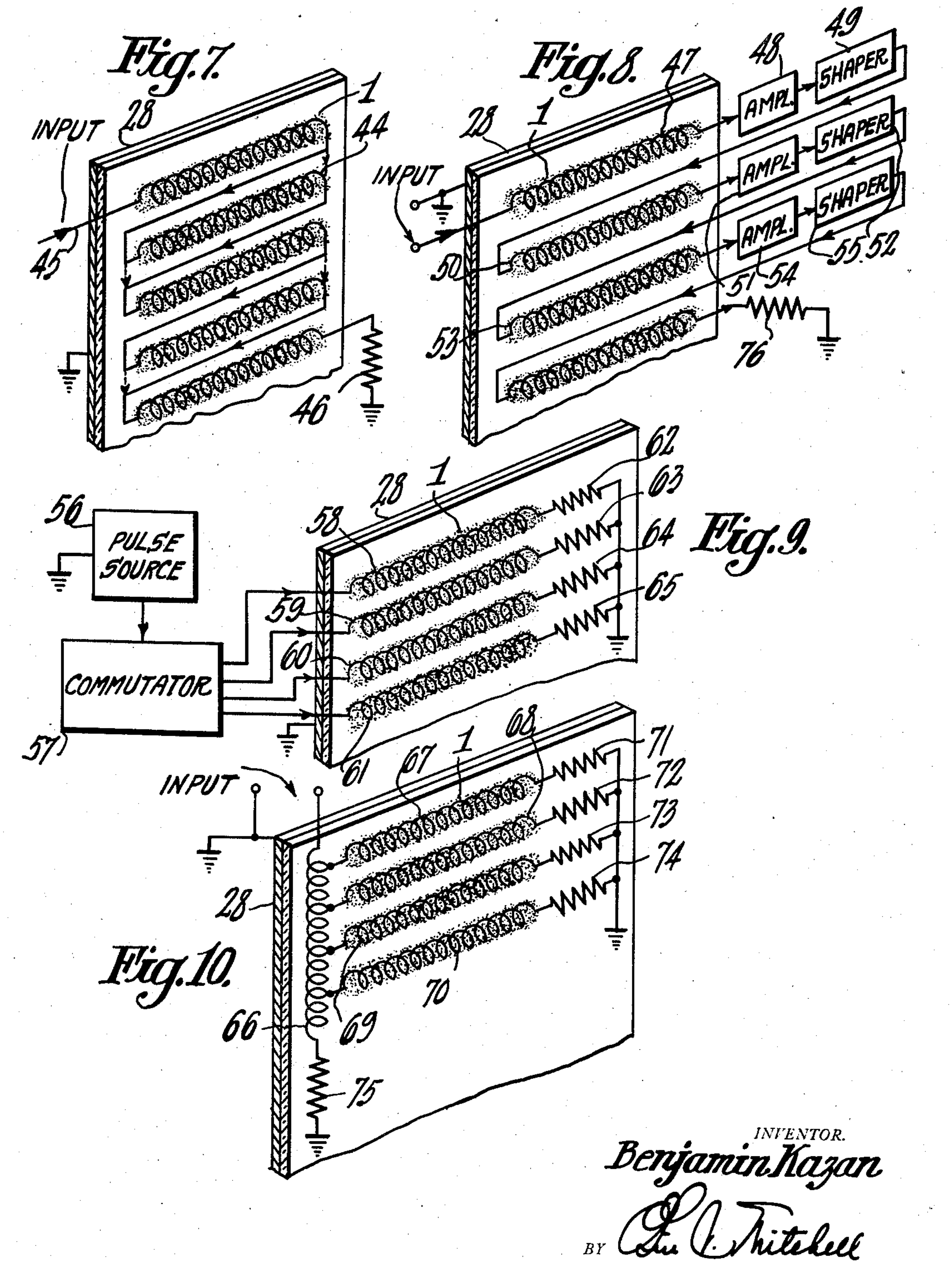
Figures 7, 8, 9 and 10 are perspective and schematic drawings illustrating different methods of forming complete scanning rasters according to the present invention.

Figure 7 is a partially perspective view showing one method of arranging the helices to form a complete raster. The pattern of scanning may be formed merely by using one long helix 44 which is placed on one side of layer 1 as shown. A conductive and light transmitting coating 28 is placed in contact with the other side. Suitable mounting structures (not shown) may be employed to give the whole assembly the requisite rigidity. Thus, a pulse applied to input conductor 45 travels from left to right on each line since the pulse travels as shown by the arrows. However, if left to right scanning is not required, the pulse may be made to travel from right to left on the even lines as indicated by the connections of the dashed lines in the figure, and from left to right on the odd lines. In either case the pulse is propagated throughout the entire length of the helix 44 to form a complete raster and finally arrives at terminating impedance 46, which is the characteristic impedance of the entire helix.

In the arrangement of Figure 7, however, there will be attenuation of the pulse since it must travel an appreciable distance. In addition there may be some changes in the pulse wave form as a result of frequency response or the phase shifts produced by the line. To prevent these effects, a form of the invention such as illustrated in Figure 8 may be employed. Here the pulses are applied between the input and the coating 28 to the top helix 47. The pulse only travels the length of one line, i. e., the length of helix 47 and then is applied to an amplifier 48 and to a shaper 49. The amplifier 48 compensates for the attenuation along the line and the shaper 49 acts to correct the waveform of the pulse before it is applied to the next line helix 50. At the end of the next line, an amplifier 51 and a shaper 52 repeat the same process and send the amplified and corrected pulse to the next line helix 53, which is coupled to amplifier 54 and shaper 55, in the same fashion. To introduce a delay at the end of each line corresponding to the retrace time of a conventional cathode ray tube type of flying spot generator, additional circuitry may be added at the end of each line or the inherent delay due to the operation of the amplifiers and the shapers may retard the pulse sufficiently. A resistor 76 is the terminating characteristic impedance.

It is also possible to adapt the basic idea of the form depicted in Figure 8, and prevent undue attenuation and waveform distortion by the apparatus pictured in Figure 9. Pulses from a source 56 are applied to a commutator 57, which feeds successive pulses first to helix 58 and then to helices 59, 60 and 61 in order. These helices are positioned in contact with one surface of layer 1, and are terminated by their characteristic impedances 62, 63, 64 and 65. Since a new pulse is used to energize each line in the embodiment of Figure 9, the pulse applied to the input of each line will be of equal magnitude and similar waveshape. Since any one pulse has to travel only a very short distance, it will undergo considerably less attenuation and distortion than in the case of the arrangement of Figure 7.

Still another form of the invention is shown in Figure 10. Here a main supply helix 66 is situated along one side of the raster area. At selected intervals a number of line helices 67, 68, 69 and 70 are fed from taps on the supply helix 66. The latter should have a lower impedance than the line helices so that it will not be appreciably shunted by the line helices. Thus, too great attenuation of the pulses in the main helix is prevented before each successive line helix is energized by the pulses. Since each tap is situated at a different point on the supply helix 66, each line helix will, therefore, be supplied with differently phased pulses. The difference in the phase of pulses applied to successive lines will be determined by the spacing between the taps which should be such that a line is not fed with a pulse until the previous pulse has traversed the length of the previous line. A number of terminating impedances 71, 72, 73 and 74 are placed at the end of each line and connected to ground, and are made to equal the characteristic impedance of each line delay helix. The impedance 75 is placed between the end of the supply helix 66 and ground. This has obvious advantages as compared with the form shown in Figure 7, inasmuch as each pulse is only required to travel the length of one line helix and therefore, less attenuation and distortion are introduced. The supply helix 66 and the coating 28 act as the main delay line whereas each line helix and the coating 28 correspond to subsidiary propagating delay lines.

Despite the lessened attenuation resulting from the embodiment of Figures 8 through 10, there are bound to be losses even within single lines. As a result, the spot generated by the propagated pulse may lessen in brightness toward the end of each line. Several alternatives may be adopted to offset this effect. A gradient of density in the number of phosphor particles could be introduced so that fewer particles per unit area would be found at the beginning of each line than at the end of the line. Therefore, at the beginning of each line the pulse, although strongest, would excite fewer phosphor particles, whereas at the end of each line the pulse being weakest would excite more phosphor particles. If a simpler expedient is desired, the raster may be covered with an optically neutral filter, which could have greater opacity at the left side than it has at the right side. As a result, the brighter spot at the left side of the raster would be optically attenuated to a greater extent than the dimmer spot on the right hand side of the raster.

Since it is characteristic of phosphors of electroluminescent materials to have a rapid response time and a short decay time, a rectangular pulse having a finite width would give rise to electroluminescence during its rise and fall time. This could conceivably result in two perceptible spots of light which tend to merge as the pulse width is decreased. To improve the resolving power of this type of flying spot generator, one may apply a single step waveform to the delay lines described in the foregoing paragraphs. Such a waveform has the advantage of producing electroluminescence during its rise time. As a result of such a voltage being applied to the input of the line, a rise in D.-C. voltage will suddenly be applied to successive points across the layer causing those points to luminesce, and causing those points to remain at this D.-C. level until these points are subsequently discharged. The next time that this line is scanned, a voltage waveform having opposite polarity is applied resulting in a sudden diminution of D.-C. potential applied to these successive points causing luminescence and discharging these points. Since the luminescence is dependent on the change of applied potential, polarity of the applied pulse is not important. Either the short type of pulse or the single step type of pulse will work satisfactorily, although with the single step apparatus some sort of polarity reversing circuit must be employed.

Having described the invention, what is claimed is:

1. Apparatus comprising in combination, an electroluminescent body, delay means in proximity to said body, said delay means being terminated in its characteristic impedance, means for applying an electric pulse to said delay means, said delay means thereupon being adapted to propagate said pulse along its length toward said characteristic impedance, said body thereupon being caused to emit light at successive adjacent points in response to said propagated pulse.

2. Apparatus including in combination: an essentially planar electroluminescent body; a plurality of conductive elements placed in parallel rows on one surface of said body; a light transmitting and electrically conductive means substantially in contact with the other surface of said body; a plurality of helices; each of said conductive elements being coupled to at least one of said helices; a plurality of terminating impedances; each of said terminating impedances being coupled to said light transmitting means and to the last conductive element of each row; said impedances having a value equal to the characteristic impedances of the effective delay line formed by said helices, said row of conductive elements, said light transmitting means, and the portion of said body intermediate said conductive means and said light transmitting means; means for applying pulses between said light transmitting means and the first helix of each row in sequence; said pulses thereupon being propagated along each said effective delay lines toward each of said terminating impedances; said pulse causing adjacent portions of said body in proximity to each of said conductive elements to luminesce in sequence causing a flying spot of light to appear which is visible through said light transmitting material.

3. Apparatus comprising in combination an electroluminescent body, a plurality of inductance means in substantial contact with one surface of said body, a light transmitting and electrically conductive material disposed in substantial contact with the other surface of said body, a plurality of amplifying means, each of said means being coupled to the end of a different one of said inductance means with the exception of the last of said inductance means, each of said means also being coupled to the beginning of the next successive inductance means, a characteristic terminating impedance coupled to said last inductance means and to said light transmitting material, means for applying voltage pulses between said light transmitting material and the beginning of the first of said inductance means, said pulses thereupon being propagated along said first inductance means, one of said amplifying means thereupon restoring the amplitude of said pulses at the end of said first inductance means, said amplifying means thereupon applying said restored pulses to the next adjacent inductive means where said pulses are similarly propagated and amplified, said pulses thereafter being applied to each remaining inductance means in succession, said pulses being similarly amplified at the end of each said remaining inductance means except the last, said body being caused to emit light in the region closest to said propagated pulses, said emitted light giving the effect of a flying spot as seen through said light transmitting material.

4. Apparatus comprising in combination, an electroluminescent body, a plurality of helices in substantial contact with one surface of said body, a light transmitting and electrically conductive material disposed in substantial contact with the other surface of said body, a plurality of wave shapers, each of said shapers being coupled to the end of a different one of said helices with the exception of the last of said helices, a characteristic terminating impedance coupled to said last helix and to said light transmitting material, means for applying voltage pulses between said light transmitting material and the beginning of the first of said helices, said pulses thereupon being propagated along said first helix, one of said shapers thereupon correcting the waveform of said pulses and applying said pulses to the next adjacent helix where said pulses are similarly corrected, said pulses thereafter being applied to each remaining helix in succession, said pulses being similarly corrected at the end of each remaining helix but the last, said body being caused to emit light in the region closest to said propagated pulses, said emitted light giving the effect of a flying spot as seen through said light transmitting material.

5. Apparatus comprising in combination, an electroluminescent body, a plurality of inductance means in substantial contact with one surface of said body, a light transmitting and electrically conductive material disposed in substantial contact with the other surface of said body, a plurality of amplifying means, each of said means being coupled to the end of a different one of said inductance means with the exception of the last of said inductance means, a characteristic terminating impedance coupled to said last inductance means and to said light transmitting material, a plurality of wave shapers, each of said shapers being coupled to a different one of said amplifying means and to the beginning of the adjacent inductance means, and means for applying voltage pulses between said light transmitting material and the beginning of the first of said inductance means, said pulses thereupon being propagated along said first inductance means, one of said amplifying means thereupon restoring the amplitude of said pulses at the end of said first inductance means, said restored pulses thereupon having their wave forms corrected by one of said shapers, said shaper thereupon applying said pulses to successive adjacent inductance means, said pulses being amplified and corrected in like manner at the end of each remaining inductance means but the last, said body being caused to emit light in the region closest to said propagated pulses, said emitted light giving the effect of a flying spot as seen through said light transmitting material.

6. Apparatus comprising in combination, an electroluminescent body, a plurality of helices in substantial contact with one surface of said body, each of said helices being parallel to the other, a light transmitting and electrically conductive material disposed in substantial contact with the other surface of said body, a plurality of amplifying means, each of said means being coupled to the end of each helix except the last, a plurality of shapers, each of said shapers being coupled to one of said amplifiers and to the next adjacent helix, means for applying voltage pulses between said light transmitting material and the beginning of the first of said helices, said pulse thereupon being propagated along said first helix whereupon one of said amplifiers and one of said shapers amplify the pulse and correct its waveform respectively, said corrected and amplified pulse thereupon being applied to successive helices, at the end of each of which except the last another of said amplifiers and said shapers is adapted to similarly amplify and correct said pulses, said last helix being terminated by an impedance which is the characteristic impedance of said plurality of helices and said light transmitting means, the region of said body in proximity to said propagated pulses being caused to luminesce to produce a flying spot visible through said light transmitting material.

7. Apparatus for producing a flying spot of light comprising in combination, an electroluminescent body, a plurality of delay lines disposed parallel to each other on one surface of said body, a plurality of terminating impedances, each impedance having the characteristic impedance of one of said delay lines, a light transmitting and electrically conductive material disposed substantially in contact with the other surface of said body, each of said terminating impedances being coupled to the end of one of said delay lines and to said light transmitting material, a source of pulses, and means coupled to said source and to each of said delay lines for applying successive pulses to a different one of said delay lines, said pulses thereupon being propagated sequentially toward each of said terminating impedances, said electroluminescent body being caused to luminesce in the region in proximity to said pulses as they are propagated, said propagation of said pulses along successive delay lines resulting in an apparently moving spot of light visible through said light transmitting material.

8. Apparatus comprising in combination, an electroluminescent body, a delay means in proximity to one surface of said body, conductive means in proximity to another surface of said body, means for applying pulses to said delay means and to said conductive means, said delay means thereupon being adapted to propagate said pulses unidirectionally along its length, said body thereupon being caused to emit light in at least one area in response to said propagated pulses.

9. Apparatus comprising in combination, a body having at least one area containing electroluminescent particles, a conductive and light transmitting material disposed substantially in contact with one surface of said body, at least one inductive element having points substantially in contact with said body in said area, means for applying pulses between said inductive element and said light transmitting material, said inductive element thereupon propagating said pulses, and means coupled to said inductive element and to said light transmitting material for preventing reflection of said pulses, said electroluminescent area being caused to emit light in regions closest to said pulses so as to produce a flying spot visible through said light transmitting material.

10. Apparatus including in combination, an electroluminescent body, having at least two distinct surfaces, an electrically conductive and transparent means substantially in contact with one of said surfaces, inductance means having numerous points in contact with the other of said surfaces, means for applying voltage pulses between one end of said inductance means and said conductive means, a terminating impedance coupled between the other end of said inductance means and said conductive means, said inductance means and said conductive means cooperating with said electroluminescent material so as effectively to comprise a delay line, said applied voltage pulses thereupon being delayed as they are propagated toward said terminating impedance, said terminating impedance being the characteristic impedance of said effective delay line, said applied voltage pulses further being adapted to cause adjacent points of said body to emit light as said voltage pulses are propagated through said delay line.

11. Apparatus comprising in combination, an electroluminescent body, a light transmitting and electrically conductive material disposed in substantial contact with one surface of said body, a plurality of conductive elements disposed in substantial contact with the other surface of said body, a plurality of inductive elements in series, each junction of any two adjacent inductive elements of said series inductances being coupled to one of said conductive elements, said conductive elements and said light transmitting material forming a plurality of capacitive elements whose dielectric is that portion of said body situated between each of said conductive elements and said light transmitting material, said inductances and said capacitive elements effectively comprising a delay line, means for applying voltage pulses between one end of said plurality of inductances and said light transmitting material, and a plurality of terminating impedances each of which is coupled to the other end of each one of said plurality of inductances and to said light transmitting material, said terminating impedances having a value equal to the characteristic impedance of said effective delay line, said effective delay line being adapted to propagate said pulses through it to cause an electric field to be applied sequentially across each of said capacitive elements, the intermediate and electroluminescent material of said capacitive elements thereupon being caused to emit light, said emitted light giving the effect of a flying spot when viewed through said light transmitting material.

12. Apparatus comprising in combination an electroluminescent body, a plurality of line helices in substantial contact with one surface of said body, a supply helix disposed in substantial contact with said surface, a light transmitting and electrically conductive material disposed in substantial contact with the other surface of said body, each of said plurality of line helices being coupled to a different point on said supply helix, a plurality of terminating impedances coupled between the ends of each of said plurality of line helices and said light emitting material, a terminating impedance coupled between the end of said supply helix and said light transmitting material, and means for applying voltage pulses between said light transmitting material and the beginning of said supply helix, said pulses being propagated along said supply helix, each of said plurality of line helices being coupled to said supply helix so that portions of said pulses are propagated along successive helices only after said pulse portion has completed its propagation through the adjacent helix, said body being caused to emit light in a region near said pulse portions as they are propagated through each of said plurality of helices, said emitted light giving the effect of a flying spot as seen through said light transmitting material.

13. Apparatus comprising in combination, an electroluminescent body, a delay line in substantial contact with one surface of said body, said delay line being so disposed as to have an undulatory configuration, a light transmitting and electrically conductive material disposed in substantial contact with the other surface of said planar body, a terminating impedance coupled to the end of said delay line and to said light transmitting material, said terminating impedance being the characteristic impedance of said delay line, and means for applying successive voltage pulses between the beginning of said delay line and said light transmitting material, said pulses thereupon being propagated along said undulatory configuration, the region of said body in proximity to said pulses being caused to luminesce as said pulses move so as to produce a flying spot of light.

14. Apparatus for producing a flying spot of light including in combination: a body of electroluminescent material adapted to emit light while under the influence of a changing electric field, means for causing an electric field to change progressively along a path of successive adjacent points of said body to cause said points to emit light sequentially as said field influences said points, and means for absorbing any energy remaining in said field after one traversal of a given path.

References Cited in the file of this patent

UNITED STATES PATENTS

| | | |
|---|---|---|
| 2,624,857 | Mager | Jan. 6, 1953 |
| 2,684,450 | Mager | July 20, 1954 |
| 2,698,915 | Piper | Jan. 4, 1955 |